July 24, 1934.  H. R. McPHAIL  1,967,418
VALVE STRUCTURE
Filed Aug. 17, 1931
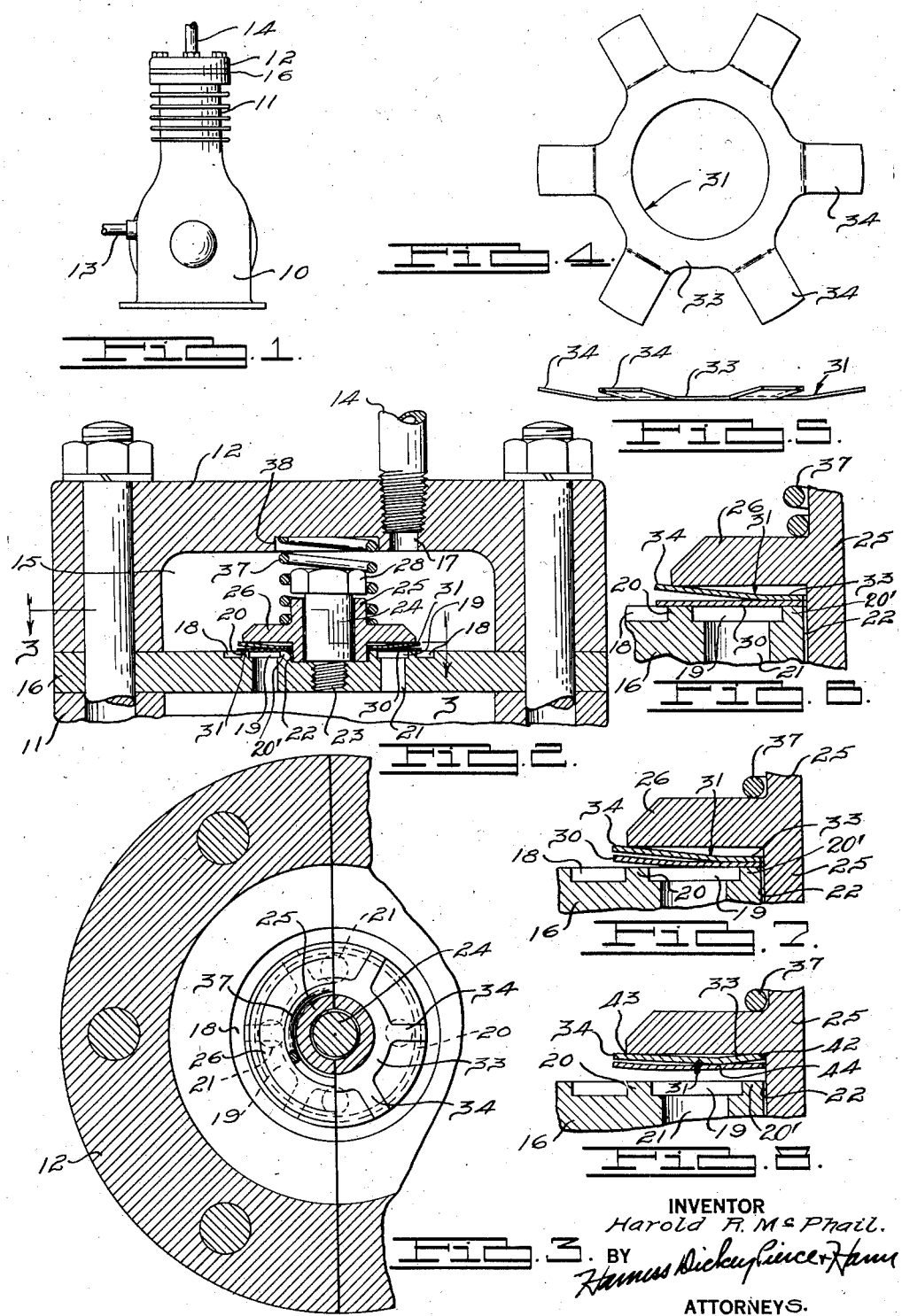
INVENTOR
Harold R. McPhail.
BY
ATTORNEYS.

Patented July 24, 1934

1,967,418

UNITED STATES PATENT OFFICE 1,967,418

VALVE STRUCTURE

Harold R. McPhail, Detroit, Mich., assignor, by mesne assignments, to Copeland Refrigeration Corporation, Mount Clemens, Mich., a corporation of Michigan Application August 17, 1931, Serial No. 557,606

4 Claims. (Cl. 251—119)

This invention relates to valve structures, and particularly to a valve structure which, because of its unusually silent operation, is particularly adaptable for use in connection with the compressors commonly employed in connection with household refrigerating mechanism.

The principal object of the invention is to provide a valve structure, particularly adapted for controlling the passage of a gaseous medium therethrough, which is extremely quiet in operation.

Another object is to provide a valve structure of the type described so constructed as to retain its quietness of operation even when subjected to an excessive amount of movement.

Another object is to provide a valve structure of the type including a flexible valve disc, with a novel form of spring means cooperating therewith for constantly urging it against its seat.

Another object is to provide a valve structure of the flexible disc type, with a novel form of spring means for urging it against its seat, and which spring means will exert a damping effect upon bodily movement of the disc.

Another object is to provide a valve structure of the flexible disc type with a star type of spring for constantly urging it against the seat, the star spring being so arranged as to exert its pressure against the disc adjacent the center of the disc and slidably cooperating with a relatively fixed surface adjacent its outer edges.

A further object is to provide a simple and effective valve structure that is economical to manufacture.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a side elevational view of a compressor of the type conventionally employed in connection with mechanical refrigerating mechanism of the household type, and to which type of compressor the present invention is particularly adaptable.

Fig. 2 is an enlarged fragmentary sectional view taken centrally through the head of the compressor shown in Fig. 1 and illustrating a suitable embodiment of the present invention incorporated therewith.

Fig. 3 is a fragmentary sectional view taken as on the line 3—3 of Fig. 2.

Fig. 4 is a plan view of the spring employed in connection with my improved valve structure.

Fig. 5 is an edge view of the spring shown in Fig. 4.

Fig. 6 is an enlarged fragmentary sectional view taken on substantially the same line as the view in Fig. 2 and illustrating the valve structure in its normal closed position.

Fig. 7 is a view similar to Fig. 6 but illustrating the valve in the position which it assumes when in open position during normal operation.

Fig. 8 is a view similar to Figs. 6 and 7 but showing the position which the valves will assume when it is forced off its seat a distance greater than that which occurs during normal operation.

In the following description the present invention will be discussed in connection with its adaptation to a piston type of compressor such as is commonly employed in connection with electrical refrigerating mechanism of the household type, the reason being that my improved valve structure is particularly adaptable for use in connection with such compressors because of the several desirable characteristics incorporated therein. However, it is to be understood that the use of this valve structure is not to be limited to refrigerating systems, or to refrigerating systems of the type described, as it will be obvious that its construction adapts it to a wide range of uses.

In view of the fact that a substantial proportion of mechanical refrigerators include the refrigerating mechanism within the refrigerating cabinet, and the cabinet itself is usually located in the kitchen or other room or area of a residence which is occupied by persons during a material part of the day, it is desirable that such refrigerating mechanisms operate as quietly as possible so as not to disturb such persons. It is a commonly accepted fact that one of the chief sources of noise in such refrigerating mechanism is the discharge valve of the compressor thereof, during normal running operation of the compressor. I have found that one of the principal reasons for this noise under normal running conditions is that due to the manner in which the valve spring has heretofore cooperated with the valve, and considering the valve to be of the flexible disc type as above referred to the "dishing" tendency of the valve is restricted and bodily movement of the valve results upon each compression stroke of the compressor. At the end of the stroke the spring forces the valve back on its seat at a speed sufficient to produce a distinct sound.

In addition, it is relatively infrequent but still a relatively common occurrence in connection with such refrigerating mechanism that for some reason or other a slug of either liquid refrigerant or of lubricant finds its way above the piston and is forced thereby through the discharge valve. Obviously, upon such an occurrence the normal capacity of the valve is exceeded, and the valve is forced bodily toward the limit of its movable position, and when the abnormal flow of material through it increases it is forced against the seat with a slap that is so clearly audible as to be objectionable.

In connection with such valves it has been common practice to employ a flexible disc as the valve element and it has even been suggested to use a star shaped spring member for urging the disc against the seat. However, in such constructions that have heretofore been suggested, the outer ends of the fingers of the star shaped springs have been placed in contact with the outer edge of the valve disc and the central portion of the spring has engaged a relatively fixed stop so as to place the spring under a suitable tension. I have found that inasmuch as the desirable action of such disc in operation is to "dish" in moving to unclose the cooperating port, the engagement of the outer ends of the fingers of the star shaped spring member with the outer edge of the disc valve tends to restrict such dishing of the valve with the result that each time the valve is open the valve moves bodily away from its normal position. I have further discovered that if the star shaped spring member is reversed, that is, so positioned that its central portion contacts with the central portion of the flexible valve disc, thereby leaving the outer edges of the flexible valve disc free to dish upwardly without a corresponding movement of the central portion of the valve disc, the operation of the valve will be substantially noiseless under normal operating conditions due to the fact that the central part of the disc will not move from its seat, but the disc will "dish" sufficiently to uncover the parts far enough to take care of the flow through them.

I have also discovered that if the outer ends of the fingers of the star shaped spring member so cooperate with the relatively fixed surface forming a stop therefor, a rubbing action between the ends of such fingers and the stop surface will occur when any condition arises which causes a bodily movement of the valve disc, such as previously described in connection with the passage of a slug of liquid refrigerant or lubricant through the valve, and this rubbing action tends to dampen such bodily movement of the valve disc. Furthermore, I have found that due to the angular relationship of the fingers of the spring with respect to the central or body portion thereof, when both the inner and outer edges of the spring are forced against the stop member, the restive force of the spring is considerably increased without destroying its resilient characteristics, and therefore substantially eliminates the knock which occurs in the construction heretofore suggested when the valve is bodily forced to the extreme limit of its open position.

In order to more clearly bring out the construction and operation of my improved valve structure, reference will now be had to the drawing. Referring to Fig. 1, a compressor is shown including a crank case 10 provided with a cylinder 11 formed integrally therewith, as is conventional practice, and provided with a cylinder head 12. Within the crank case 10 is located a crank shaft which is connected by means of a connecting rod to a piston which, in turn, is provided with a check valve in its head, all of which is not shown in the drawing but may be of any conventional construction. An inlet passage 13 leads into the crank case 10 and an outlet duct 14 extends from the cylinder head 12. As illustrated in Fig. 2 the cylinder head 12 is internally recessed as at 15 and positioned between the cylinder head 12 and the cylinder 11 is a plate 16 which is commonly termed a valve plate. The outlet duct 14 connects with the recess 15 through the passage 17. In its upper surface the valve plate 16 is provided with a pair of concentric annular grooves or recesses 18 and 19, forming between them an annular ridge 20 whose upper surface serves as a valve seat. A second valve seat 20', coplanar with the seat 20, is formed between the recess 19 and the central recess 22 opening upwardly in the plate 16. Passages 21 extending through the plate 16 connect the groove 19 with the under face of the plate 16, between which and the piston (not shown) the gas is compressed.

A centrally located recess 22 is formed in the upper surface of the plate 16 and a bolt 23 centrally positioned with respect to the recess 22 is threaded into the plate. The bolt 23 is provided with an enlarged portion 24, about which is disposed, what is generally termed a valve disc post 25, having a radially extending flange portion 26 forming a stop surface intermediate the upper and lower edges thereof. The member 25 is slidably disposed on the bolt 23 with the bottom portion thereof positioned in the recess 22, and the lower surface of the flange portion 26 spaced, from the upper surface of the valve plate 16. The upper end of the member 25 is normally spaced from the bottom surface of the head 28 of the bolt 23 by means of a spring 37, the purpose of which will hereinafter be described.

As shown in Figs. 2 and 6, a centrally apertured valve disc 30 is disposed on the body portion of the member 25 intermediate the flange portion 26 and the plate 16, with the under side of the valve disc 30 normally contacting with the valve seat portions 20 and 20' of the plate 16. As best shown in Fig. 6, the valve disc 30 when the compressor is inactive or is on the suction stroke, is disposed in a relatively flat plane with the outer and central portions of the disc abutting the upper surface of the plate 16 at opposite sides of the groove 19. A spring plate 31, which may be of various forms but preferably of a star-like structure, as shown in Figs. 4 and 5 for the purpose as will hereinafter be apparent, is slidably disposed about the lower end of the member 25 between the valve disc 30 and the flange member 26. The spring member 31, as shown in Figs. 4 and 5, is provided with a relatively flat central portion 33 disposed adjacent the hub portion of the member 25 and normally in contacting relation with the central portion of the valve disc 30, and a plurality of upwardly dished radially extending arms 34, the arms being so bent as to contact with the bottom surfaces of the flange 26 adjacent the outer edge thereof. As shown in Figs. 6 and 7, the spring member 31 when the compressor is either not operating or when operating under normal running condition maintains its position as shown, with the central portion 33 contacting with the valve disc and the upwardly bent radially extending arms 34 contacting with the lower surface of the flange 26 adjacent the outer edge thereof.

The helical spring 37, one end of which encircles a portion of the member 25 in contacting relation with the flange 26, and the other end of which is in a circular recess 38, is provided to normally maintain the member 25 in contacting relation with the plate 16 at the bottom of the recess 22. However, it will be noted that the resiliency of the spring 37 is such that should a slug of refrigerant or lubricant or the like be discharged through the ports, the member 25 is permitted to move upwardly until the upper end of the member 25 contacts with the nut 28, thus providing a maximum amount of area for the passage of such slug.

In the operation and application of the invention, refrigerant enters through the inlet pipe 13, after which it is compressed and forced through the openings 21 into the compartment 15, thence through the outlet pipe 14. In compressing the refrigerant and forcing it through the openings 21, the valve disc 30, which is normally positioned, as shown in Fig. 6, and which is maintained in such position by the spring member 31, until sufficient pressure is exerted thereagainst, is upwardly dished sufficiently to uncover the ports or openings 21 permitting a flow of the refrigerant therethrough. As shown in Fig. 7, the central portion of the valve disc 30 is resiliently urged against movement during operation of the compressor, by means of the central portion 33 of the spring member 31 which contacts with the central portion of the valve disc. With the central portion of the flexible disc 30 so urged the outer edge thereof is freely permitted to dish upwardly without any movement whatever of the central portion. As upward movement of the disk 30 and spring member 31 are limited, the normal contour of the spring is changed when any condition arises which causes a bodily movement of the valve disc such as shown in Fig. 8 and such as previously described in connection with the passage of a slug of liquid refrigerant or lubricant through the valve. The deformation of the spring member causes a rubbing action between the arms 34 of said member and the flange 26 which tends to dampen bodily movement of the valve disc. When subjected to unusual forces the inner edge of the relatively flat portion 33 and the outer edge of the arms 34 of the member 31 assume positions as shown in Fig. 8 with the respective portions contacting with the lower surface of the member 25 as indicated at 42 and 43. It will be noted that this provides a line contact between the disc 30 and the spring member 31 as indicated at 44 with the outer portion of the disc dished upwardly and away from the plate 16. Also it will be noted that in this movement the valve disc 30 is always maintained in contacting relation with the spring member 31 which, as hereinbefore stated, prevents slapping action of the valve disc thereby providing a construction substantially noiseless in operation. While the spring and the disc are adapted to move vertically, the outer ends of the arms 34 move radially, thus providing a sliding action of the arms of the spring adjacent the lower and outer edge of flange 26 of the valve disc stop member 25.

From the foregoing description it is apparent that I have provided a valve construction particularly adapted for use in connection with refrigerator compressors, in which a flexible valve disc is constantly urged against its seat by means acting thereon at its center only, thus providing a unit in which the slapping and knocking heretofore apparent in compressors is entirely obviated. Moreover in the employment of an apparatus having the structural features and the combination of parts as described above, a compressor is provided which is not only equally as durable as any of the compressors heretofore provided, but a valve construction is provided that is more efficient in operation and considerably quieter than the valves in compressors heretofore provided.

While I have shown in the drawing a particular illustrative view of my invention, various modifications may be made in the same, and in the various features of construction without materially changing the invention therein, and formal changes may be made in the specific embodiments of the invention described without departing from the spirit or substance of the broad invention, the scope of which is commensurate with the appended claims.

I claim:

1. A valve structure including a post having a radial flange associated therewith, a member having an annular valve seat concentric with said post, a flexible valve disc slidable on said post between said seat and said flange, and a spring comprising a central ring portion abutting the central portion of said disc and a plurality of radially outwardly and axially bent fingers contacting said flange only at its outer peripheral edge for constantly urging said disc against said seat.

2. A valve structure including a member having an annular valve seat, a flexible disc cooperating with said seat, means including a circular abutment for limiting the normal movement of the valve disc away from said seat, and a spring member positioned between the disc and said abutment, said spring member including a central ring portion abutting the central portion only of said disc and a plurality of radially outwardly and axially bent fingers slidingly contacting the outer peripheral edge of said abutment and constantly urging said disc against the seat.

3. A valve structure including a plate having openings therethrough, a flexible valve disc positioned on the plate for closing the openings, a flanged element resiliently mounted on the plate for normally limiting bodily movement of the disc away from said openings, a spring member comprising a central ring portion abutting the central portion only of said disc and a plurality of radially outwardly and axially bent fingers contacting said flanged element for constantly urging said disc against said plate.

4. A valve structure including a valve plate having a plurality of annular recesses therein, one of said recesses being connected with a plurality of openings extending through the valve plate, a flexible valve disc positioned on the plate for closing the openings, a spring pressed post positioned concentrically of the recesses for limiting normal movement of the valve disc away from said openings, said post having a radially extending flange portion thereon, and a spring member comprising a central ring portion abutting the central portion only of the disc and a plurality of radially outwardly and axially bent fingers contacting said flange adjacent the outer periphery thereof, for constantly urging said disc against the valve plate.

HAROLD R. McPHAIL.